March 17, 1953     P. V. WHITNEY     2,631,818
POWER CONTROL MECHANISM AND WINCH FOR CABLE DRAWN SCOOPS
Filed Oct. 25, 1949     2 SHEETS—SHEET 2
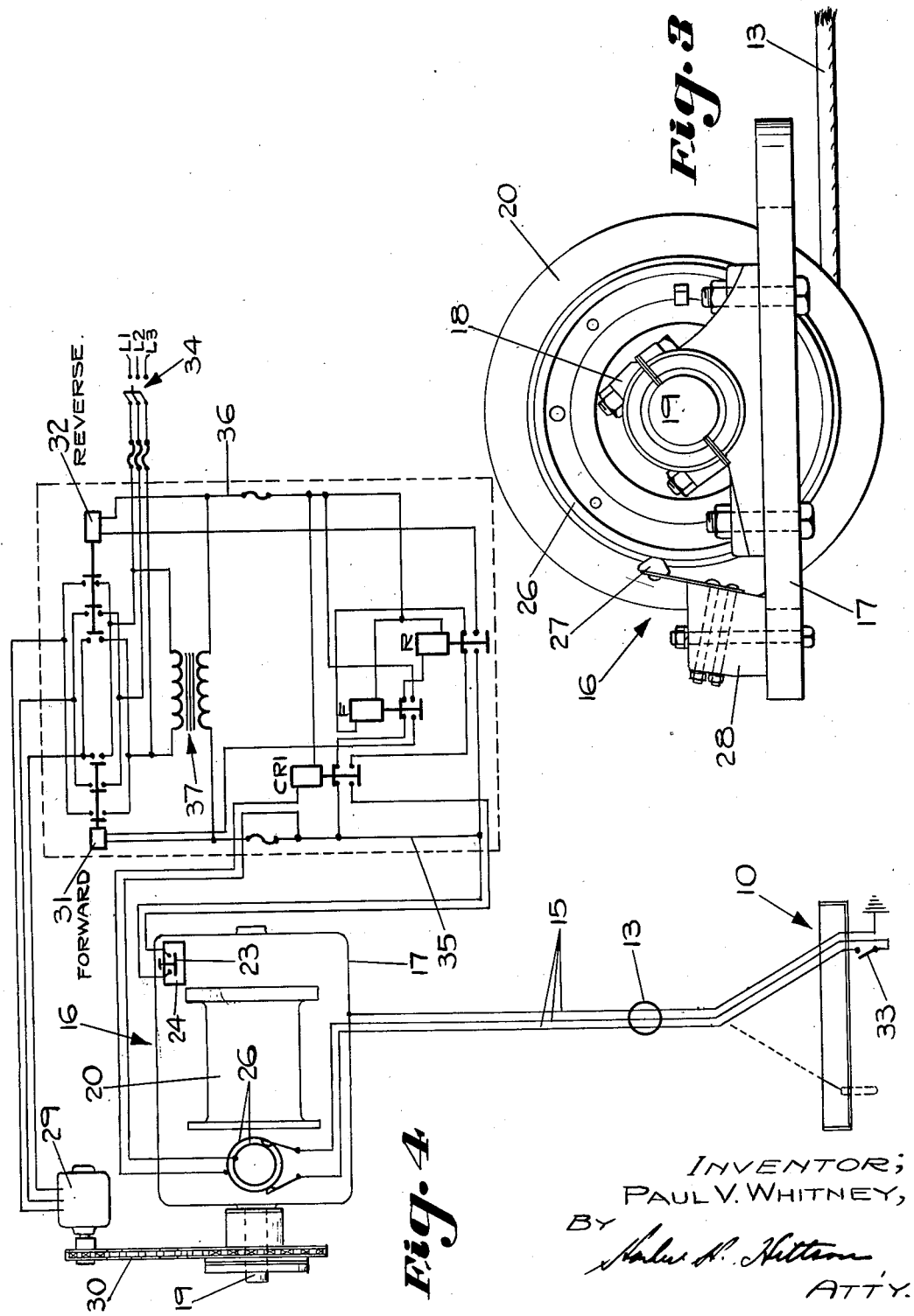
INVENTOR;
PAUL V. WHITNEY,
BY
ATT'Y.

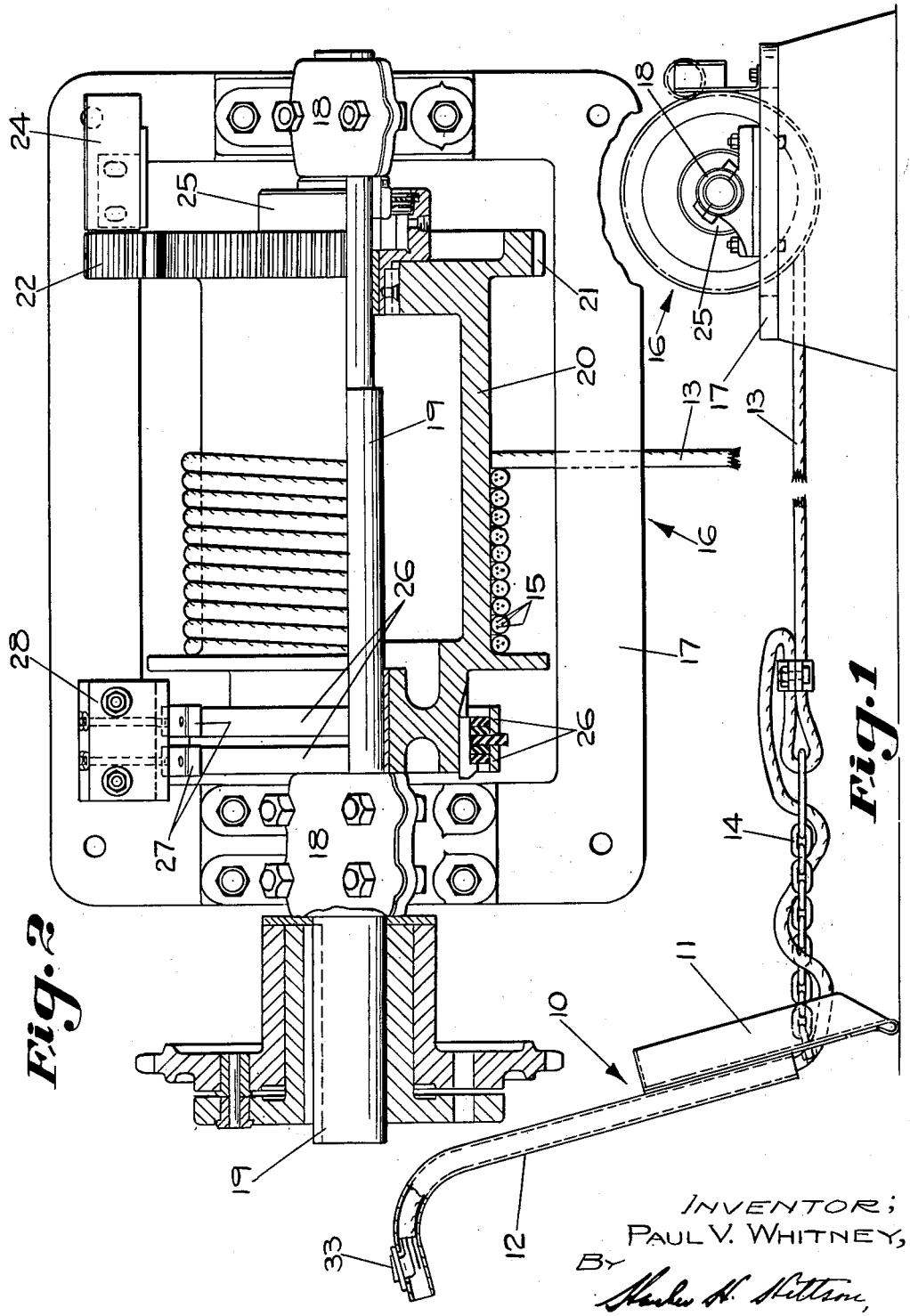

Patented Mar. 17, 1953

2,631,818

UNITED STATES PATENT OFFICE 2,631,818

POWER CONTROL MECHANISM AND WINCH FOR CABLE DRAWN SCOOPS

Paul V. Whitney, Columbus, Ohio, assignor to The Jeffrey Manufacturing Company, a corporation of Ohio Application October 25, 1949, Serial No. 123,372

11 Claims. (Cl. 254—173)

This invention relates to a power operated shovel, particularly of the type in which a scoop is pulled by a winch and associated cable, and an object of the invention is to provide improved apparatus of this type in which safety control means are provided so as readily to apply and release the pulling force on the cable and to permit, under certain conditions, the manual pulling out of the cable to position the scoop for power operation.

Other objects of the invention will appear hereinafter, the novel features and combinations being set forth in the appended claims.

In the accompanying drawings:

Fig. 1 is a somewhat diagrammatic elevational view of a power shovel incorporating the features of my invention;

Fig. 2 is an enlarged combination plan and sectional view of the power operated winch and associated cable;

Fig. 3 is an end view of the power operated winch; and

Fig. 4 is a view of the winch and its driving motor and the associated electrical control system.

Shovels or scoops which are used, for example, to unload granular material, such as grain or the like, from boxcars, in which the shovel or scoop is pulled by a motor driven winch and associated pull cable, have heretofore been employed, but they have certain dangerous characteristics or the safety mechanism is expensive and in some instances complicated. In the invention here involved a very simple arrangement has been provided which has a number of very desirable safety characteristics, particularly in that the operator must hold onto the handle of the shovel or scoop in order for it to be pulled under power, and furthermore when it is pulled in a predetermined amount the driving motor is automatically disabled until a controlling switch on the scoop handle is released.

As illustrated in Fig. 1 of the drawings, there is a shovel or scoop 10 having a blade 11 adapted to shovel or scoop material, such as grain. The blade 11 is provided with a handle 12 which may be grasped by an operator for operation of the scoop, particularly for placing it in any desired position and controlling its path of travel under the guidance of a pulling cable 13 which is attached to the scoop 10 as by a chain 14. The cable 13 is primarily a draft or pulling cable, but is also preferably provided with three electrical conductors 15, the function of which will be described hereinafter.

The cable 13 leads to a winch 16 which includes a main frame 17 which may be anchored by any desired means, generally removed from the surface which is to be cleaned of granular material. For example, it may be mounted on a sub-frame and temporarily attached outside the boxcar from which grain is to be removed. Mounted for rotation on bearings 18 at opposite ends of the frame 17 is a drive shaft 19 which extends freely through a winch drum 20 journaled thereon for rotation. The drum 20 receives the cable 13, one end of which is preferably anchored thereto.

At the right-hand end, as viewed in Fig. 2 of the drawings, the drum 20 carries a large gear 21 which meshes with a smaller gear 22 which is adapted to operate a control switch 23 (see Fig. 4), which is contained within a housing 24, said switch 23 being of standard construction and of the type that it is normally closed, but upon a predetermined rotation of the gear 22 it will be open. In other words, switch 23 will be open whenever a predetermined amount of cable 13 is reeled onto the drum 20.

As above mentioned, the drum 20 is mounted for free rotation on the shaft 19. A driving connection is effected between the shaft 19 and the drum 20 through an over-running clutch 25 which may be of any well known construction, having the characteristic that when the shaft 19 is rotated in a counterclockwise direction, as viewed in Fig. 1 of the drawings, a driving connection will be effected between said shaft 19 and the drum 20, thereby to pull on the cable 13 and apply a pulling force to the shovel or scoop 10. On the other hand, the over-running clutch 25 provides for relatively free clockwise rotation of the shaft 19, as viewed in Fig. 1, thus allowing the drum 20 to remain without rotation when said shaft 19 is rotating in said clockwise direction, or permitting the operator to pull out on the shovel 10 and thus pull out on the cable 13 and rotate the drum 20 in the same direction that the shaft 19 is rotating, this free pulling out of the shovel or scoop 10 and cable 13 being provided so long as the speed of rotation of the drum 20 does not tend to exceed that of the shaft 19.

At the left-hand side, as viewed in Fig. 2, the drum 20 is provided with a pair of electrical collector rings 26 which are insulated from each other and from the drum 20. Individual collector ring brushes 27 carried on a post 28 cooperate with the collector rings 26 and are connected to two of the conductors 15 which extend through the cable 13. The third conductor 15 is preferably connected at one end to the drum 20, and the other end of it is connected to the shovel 10, thus effecting a grounding or voltage neutralizing connection between the two.

The shaft 19 is adapted to be reversely driven from a reversible electric motor 29 (see Fig. 4) through appropriate drive gearing 30 of any conventional type, such as a chain and sprocket or multiple V-belt drive.

The electrical system for controlling the motor 29 and, as a consequence, controlling the winch 16, provides for an improved and novel type of operation and will now be described. The motor 29 is shown as of the three-phase type and is controlled from a three-phase source of power indicated by the lines L1, L2 and L3. The direction of rotation of the motor 29 is controlled by a pair of magnetic switches including a forward operating coil 31 and a reverse operating coil 32. Two of the conductors 15 which are connected to the collector rings 26 lead to a push-button type switch 33 which is carried at the end of the handle 12, and which is spring-biased to its open position. In other words, it is necessary for the operator to close the switch 32 and to hold it closed. This is very desirable because, as hereinafter described, should the operator get into difficulty of any type and drop the shovel 10, the driving motor 29 will automatically reverse so that the cable 13 will not be pulled in any further. This is an important safety feature.

The rest of the electrical circuit can best be described in connection with the description of a typical cycle of operation of the unit. Assuming that the unit is to be placed in operation after being installed, the operator will close the line switch 34 which will energize the buss bars 35 and 36 over the step-down transformer 37. This will immediately cause the energization of the motor reversing coil or solenoid 32 which will operate the associated contacts to cause the rotation of the motor 29 in what is designated the reverse direction; that is, in which it rotates the shaft 19 clockwise, as viewed in Fig. 1 of the drawings, in which through the over-running clutch 25 there is no driving force transmitted to the drum 20.

The circuit for the coil or solenoid 32 is as follows. The normally closed upper contacts of a relay CR1 extend power from the buss bar 35 over obvious conductors to the upper normally closed contacts of relay F to energize relay R, one side of which is connected to buss bar 36. Relay R on energizing closes its lower normally open lower contacts and energizes solenoid or coil 32 over an obvious circuit extending between buss bars 35 and 36. Thus the mere throwing of the power switch 34 starts the motor 29 rotating in its reverse or clutch over-running direction which is without particular significance insofar as the immediate action on drum 20 is concerned. With the motor 29 thus reversely rotating, the operator can pull the cable 13 out, thus rotating the drum 20 in the direction of rotation of the shaft 19, or, in other words, rotating the drum 20 reversely, the reverse rotation being understood as meaning that the cable 13 is paying out.

The rate of rotation of the drum 20 cannot exceed the rate of rotation of the shaft 19. Otherwise, the clutch 25 would become engaged. It is evident, however, that the cable 13 can only be paid out, while the shaft 19 and its driving motor 29 are being reversely rotated as above described. This permits the operator to pull out freely on the cable 13 and thus move the scoop or shovel 10 away from the winch 16 manually any desired amount.

When the scoop 10 has thus been positioned, as desired by the operator, the operator will close the push-button switch 33 and hold it closed as long as he desires the power cable to pull in on said scoop. Closing of the switch 33 extends the circuit over the previously mentioned two conductors of the set 15 and over the collector rings 26 to a pair of obvious conductors which energize relay CR1, since switch 33 directly connects it across buss bars 35 and 36 when closed. Relay CR1 upon being energized breaks its upper normally closed contacts and closes its lower normally open contacts. Said upper contacts, upon being opened, de-energize relay R, allowing it to drop out, which de-energizes the switch solenoid 32, thus opening the reversing circuit to the motor 29.

The lower contacts of relay CR1 on closing energize the relay F over a circuit which extends from buss bar 36 by way of an obvious conductor to one terminal of relay F, the other terminal of which extends through the now closed upper contacts of relay R, the now closed lower contacts of relay CR1, and over a pair of obvious conductors leading through the aforedescribed switch 23 to the buss bar 35. Switch 23 will be closed whenever cable 13 is pulled out any appreciable distance. Relay F, upon being energized as above mentioned, closes its lower contacts to energize the coil or solenoid 31 which is the forward direction switch for the motor 29, the circuit therefore extending between buss bars 35 and 36 over obvious conductors.

It is thus manifest that when switch 33 is closed under normal conditions the motor 29 and the drum 20 will be rotated in the forward direction which means the direction in which the cable 13 is pulled in by the winch 16, thus pulling in the scoop or shovel 10. By the simple expedient of releasing the push-button switch 33 and thus opening it, the motor 29 automatically reverses its direction of rotation. The drum 20, however, does not automatically reverse its direction of rotation because it is power driven only in the forward direction. Reverse rotation of the drum 20 is effected only manually, by the operator pulling on the cable 13 to rotate it. It is thus manifest that the operator has complete control of the winch 16 from the handle switch 33. If, for any reason, the operator should inadvertently fail to release the switch 33 when the cable 13 is pulled in so that its length reaches a desired minimum, a safety feature is provided by the switch 23. That is, switch 23 will open whenever a predetermined amount of cable has been reeled on the drum 20 and this will de-energize the relay F, the circuit of which extended through said switch 23, as above described.

Relay F, upon being de-energized, will drop out and through its lower contacts de-energize the forward solenoid switch 31. This is the only condition under which the motor 29 is stopped during the operation of the unit while the switch 34 is closed. If the operator allows the cable 13 to be so reeled up as to operate the switch 23, the system can be immediately placed in operation by the simple expedient of releasing the switch 33, because when switch 33 is released, relay CR1, which was energized while switch 33 was closed, is immediately de-energized upon the opening of said switch 33. This produces the circuit condition first above described, in which relay R is energized, thus energizing reversing switch solenoid 32 to produce the above described reverse rotation of the motor 29 and shaft 19. In this regard it is to be noted that the switch 23 has no control whatever over the reverse rotation of the motor 29, said reverse operation always occurring whenever switch 33 is open. The forward operation of the motor 29 will normally occur whenever switch 33 is closed, but this forward motion, being the only one in which power is actually applied to the cable 13, will be interrupted when either switch 23 or switch 33 is opened.

From the above description of the normal operation of the complete power operated shovel, it is obvious that a very flexible one has been produced with a minimum of controls, while at the same time providing significant protective features. In this regard it is to be noted that there is a complete absence of any magnetic clutches or the like which are expensive items. The over-running clutch 25 is a standard, inexpensive unit. Furthermore, there is no situation under which an attempt is made to disengage the power drum from its driving motor while it is under load. Experience has shown that this is a dangerous situation because sometimes a cable gets caught and to prevent damage or harm to an operator it is desirable to disengage the drum from its driving motor. As is well known, this is frequently a difficult and sometimes impossible task where mechanical jaw clutches, or the like, are involved, as have been sometimes heretofore employed with power operated shovels of this general type.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In combination, a winch, a pulling cable extending from said winch operable to be pulled in by said winch when the latter is driven forward, a cable control switch adjacent the free end of said pulling cable, electrical conductors extending through said cable from said winch to said control switch, a reversible electric motor for driving said winch, an over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction, said control means also including limit switch and control means operable when said cable is pulled in a predetermined amount to stop said motor if said control switch is closed and to reverse said motor when said cable control switch is opened.

2. In combination, a winch, a pulling cable extending from said winch operable to be pulled in by said winch when the latter is driven forward, a cable control switch adjacent the free end of said pulling cable, electrical conductors extending through said cable from said winch to said control switch, a reversible electric motor for driving said winch, an over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction.

3. In combination, a winch, a pulling cable extending from said winch operable to be pulled in by said winch when the latter is driven forward, a cable control switch adjacent the free end of said pulling cable, electrical conductors extending through said cable from said winch to said control switch, a reversible electric motor for driving said winch, and over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction, said control means also including limit switch and control means operable when said cable is pulled in a predetermined amount to stop said motor.

4. In combination, a winch, a pulling cable extending from said winch operable to be pulled in by said winch when the latter is driven forward, a cable control switch adjacent the free end of said pulling cable, electrical conductors extending through said cable from said winch to said control switch, a reversible electric motor for driving said winch, an over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction, said control means also including limit switch and control means operable when said cable is pulled in a predetermined amount to stop said motor if said control switch is closed.

5. In combination, a winch, a pulling cable extending from said winch operable to be pulled in by said winch when the latter is driven forward, a cable control switch, a reversible electric motor for driving said winch, an over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction, said control means also including limit switch and control means operable when said cable is pulled in a predetermined amount to stop said motor if said control switch is closed and to reverse said motor when said cable control switch is opened.

6. In combination, a winch, a pulling cable extending from said winch operable to be pulled in by said winch when the latter is driven forward, a cable control switch, a reversible electric motor for driving said winch, an over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction.

7. In combination, a winch, a pulling cable extending from said winch operable to be pulled in by said winch when the latter is driven forward, a cable control switch, a reversible electric motor for driving said winch, an over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction, said control means also including limit switch and control means operable when said cable is pulled in a predetermined amount to stop said motor.

8. In combination, a winch, a pulling cable extending from said winch operable to be pulled in by said winch when the latter is driven forward, a cable control switch, a reversible electric motor for driving said winch, an over-running clutch interconnecting said reversible motor and said winch and connected to drive said winch to pull in said cable when said motor and winch rotate in their forward directions and providing for rotation of said motor without driving said winch when said motor is reversed, and control means for said motor including relay means operable in response to closing of said control switch to operate said motor in its forward direction and operable in response to opening of said control switch to operate said motor in its reverse direction, said control means also including limit switch and control means operable when said cable is pulled in a predetermined amount to stop said motor if said control switch is closed.

9. In combination, a winch, a pulling cable extending from said winch operable to be pulled in by said winch when the latter is driven in one direction, a control switch adjacent the free end of said cable, a reversible electric motor connected to drive said winch, electrical control means for said motor, electrical conductors extending from said control switch to said electrical control means, and an over-running clutch interconnecting said reversible motor and said winch and connected to drive said winch to pull in said cable when said motor rotates in said one direction and providing for rotation of said motor without driving said winch when said motor is reversed, said electrical control means for said motor including relay means operable in response to closing of said control switch to operate said motor in said one direction and operable in response to opening of said control switch to operate said motor in a direction reverse to said one direction.

10. In combination, a winch, a pulling cable extending from said winch operable to be pulled in by said winch when the latter is driven in one direction, a control switch, a reversible electric motor connected to drive said winch, electrical control means for said motor, electrical conductors extending from said control switch to said electrical control means, and an over-running clutch interconnecting said reversible motor and said winch and connected to drive said winch to pull in said cable when said motor rotates in said one direction and providing for rotation of said motor without driving said winch when said motor is reversed, said electrical control means for said motor including relay means operable in response to closing of said control switch to operate said motor in said one direction and operable in response to opening of said control switch to operate said motor in a direction reverse to said one direction.

11. In combination, a winch, a pulling cable extending from said winch operable to be pulled in by said winch when the latter is driven in one direction, a control switch, a reversible electrical motor connected to drive said winch, electrical control means for said motor, and electrical conductors extending from said control switch to said electrical control means, said electrical control means for said motor including relay means operable in response to closing of said control switch to operate said motor in said one direction and operable in response to opening of said control switch to operate said motor in a direction reverse to said one direction.

PAUL V. WHITNEY.

REFERENCES CITED

The following references are of record in the file of this patent:

UNITED STATES PATENTS

| Number | Name | Date |
|---|---|---|
| 563,172 | Harnden | June 30, 1896 |
| 681,941 | Westbrook | Sept. 3, 1901 |
| 1,352,045 | Bergey | Sept. 7, 1920 |
| 1,413,094 | Bergey | Apr. 18, 1922 |
| 1,564,781 | Hansen | Dec. 8, 1925 |
| 1,664,377 | Clark | Mar. 27, 1928 |
| 1,953,783 | Stone | Apr. 3, 1934 |